Toshihisa Takada
Shigenobu Tanaka
Seiichi Nishikawa
INVENTORS by George B. Oujevolk
Attorney

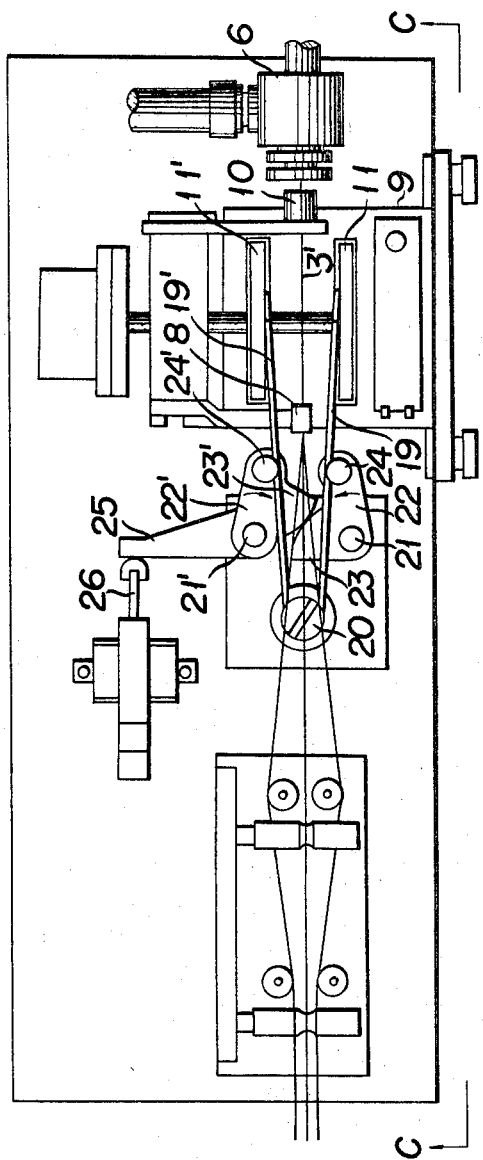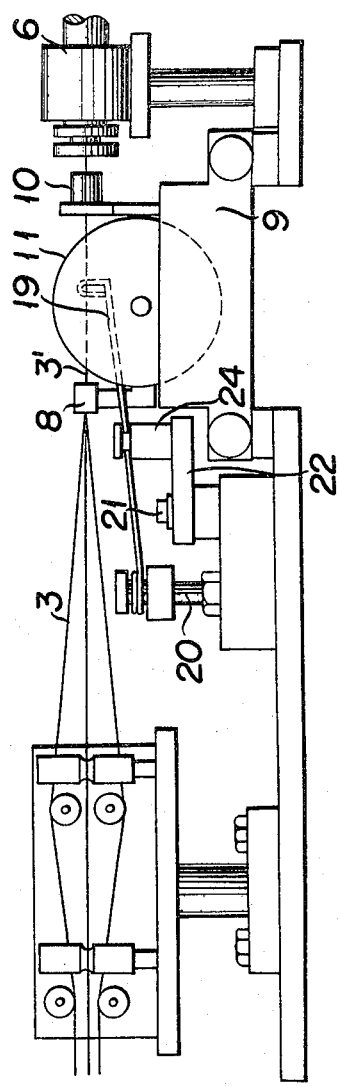

May 21, 1968

TOSHIHISA TAKADA ET AL
APPARATUS FOR INTERMITTENTLY APPLYING
ADHESIVE TO STRING-LIKE MEMBERS 3,383,846

Filed Nov. 9, 1966

Toshihisa Takada
Shigenobu Tanaka
Seiichi Nishikawa
INVENTORS by George B. Auyeath
attorney

United States Patent Office 3,383,846
Patented May 21, 1968

3,383,846
APPARATUS FOR INTERMITTENTLY APPLYING ADHESIVE TO STRING-LIKE MEMBERS
Toshihisa Takada, Sakura-shi, Shigenobu Tanaka, Nerima-ku, Tokyo, and Seiichi Nishikawa, Suginami-ku, Tokyo, Japan, assignors to The Fujikura Cable Works, Ltd., Koto-ku, Tokyo, Japan, a corporation of Japan
Filed Nov. 9, 1966, Ser. No. 593,073
Claims priority, application Japan, Nov. 11, 1965, 40/69,492; Nov. 22, 1965, 40/71,673
7 Claims. (Cl. 57—35)

ABSTRACT OF THE DISCLOSURE

An apparatus for intermittently applying adhesive to a strand and in particular where the adhesive is applied to twist reversal points on said strand. An applicator device is employed wherein the applicator receives adhesive from a rotating wheel submerged in an adhesive bath and the applicator is moved into and out of contact with the yarn in a controlled manner.

---

The present invention relates to an improved apparatus for intermittently applying an adhesive to a string or the like member, and particularly to an improved apparatus for intermittently or cyclically applying and fixing a certain amount of an adhesive to each portion where reversal of twist takes place of an alternately left-hand and right-hand stranded conductor constituting a communication cable in order to prevent loosening of twist of adjacent portions of left-hand or right-hand stranded conductor.

Conventionally, usual communication cables have been manufactured by first twisting together individual wire conductors into pairs or quads to form a conductor unit and then twisting further individual conductor units into a single cable, for the purpose of eliminating or minimizing cross-talk between adjacent circuit lines as well as increasing the flexibility of the cable. The twisting operation to form a cable has heretofore been attained by the provision of bobbins or reels either at pay-out or take-up side and by revolving them to impart twist to conductors such as individual wire conductors or conductor units. When a great quantity of pay-out or take-up conductors is to be wound up on such bobbins or reels, however, the weight and the size of these bobbins or reels, which are inevitably very large, impose restriction upon their revolving speed, rendering it very difficult to better the production efficiency.

To overcome the above difficulty what is termed an accumulation-and-reverse method has been developed where instead of revolving the above-mentioned bobbins or reels provided either at pay-out or take-up side about an axis lying in the direction of travel of conductors so as to twist together paid-out conductors, these bobbins or reels are merely used as the pay-out or take-up means and there are provided between pay-out and take-up stations separate means which accumulate a predetermined length of conductors thereon while imparting twist to the paid-out conductors, and whose revolution is reversed when the predetermined length of the accumulated conductors is reached, whereby the afore-mentioned restriction upon the revolving speed is eliminated and the individual wire conductors may be twisted into pairs, quads, or other units and finally into a single cable through an all-round production line where various twisting processes are combined in serial as well as parallel manners.

A stranded conductor obtained in the above manner accordingly consists of alternately left-hand and right-hand twisted portions of a predetermined length intervened therebetween by portions where reversal of twist from left-hand to right-hand or from right-hand to left-hand takes place, these twist reversal portions readily giving rise to loosening of twist when tension is imparted to the stranded conductor.

In order to prevent the loosening of twist of this type of the stranded conductor it has been a usual practice to apply to the twist reversal portions of the stranded conductor an adhesive such as melt or suitable solution of thermoplastic resin, for instance, polyethylene, and fix the applied adhesive by cooling or drying it.

The application of adhesive to the twist reversal portions has heretofore been made by extruding the adhesive by means of a piston. Such a method, however, is not economical since it is very difficult to reduce the length of portions of the stranded conductor which is to be applied with adhesive, resulting in waste of excess adhesive and the actuating mechanism for use in such a method is very complicated to the disadvantage.

Further, in applying adhesive to the above-mentioned portions it is important that the adhesive should be applied to these portions uniformly and in such a manner that the adhesive-applied portion has a cross section with a minimum of required diameter lest the external form of the adhesive-applied portion should have any unfavorable influence upon the rest of the conductors. Accordingly, immediately after applying adhesive to these portions of the stranded conductor the adhesive-applied portions should be passed through a suitable squeezing die to squeeze off excess adhesive so that the adhesive-applied portion may have predetermined over-all dimensions.

The prior-art squeezing die, however, has some difficulties in that when it is kept at a temperature below melting point or softening point of the adhesive it cools down the adhesive on the stranded conductor at the instance the adhesive touches it to hinder uniform deposition of the adhesive over the surfaces of the stranded conductor as well as causing portion of the applied adhesive to cumulatively settle around its feed port and eventually choke it, thus bringing about as a result damage to insulation and breaking of the conductors. On the other hand when the squeezing die is maintained above the melt or softening point of the adhesive, it can squeeze off the excess adhesive on the stranded conductor smoothly passing therethrough very well. However, precise control of the die heating temperature is comparatively difficult, and in case the travel of the conductors is accidentally stopped the insulation covers of portions of the conductors incidentally brought to stop within the die at an elevated temperature will be excessively heated so that they soften or melt, thereby hampering the uniformity of insulation of the conductors. Accordingly, with the conventional squeezing dies it has been difficult to obtain excellent products continuously.

An object of this invention is to provide a novel apparatus for intermittently applying adhesive to a string-like member such as stranded conductor without wasting excess adhesive under the action of a simple actuating mechanism.

Another object of this invention is to provide novel squeezing dies to be used in the above novel apparatus for squeezing excess adhesive off the string-like member so as to assure adhesive deposition of predetermined dimensions.

Other objects and features of this invention will become apparent from the following description about some preferred embodiments thereof with reference to the accompanying drawings, in which:

FIG. 6 is a plan view of another embodiment of the apparatus according to the invention;

FIG. 7 is a side view of the apparatus shown in FIG. 6 as viewed from line C—C of FIG. 6;

In the drawings the same or similar parts are designated by like reference numerals.

Figure 1:
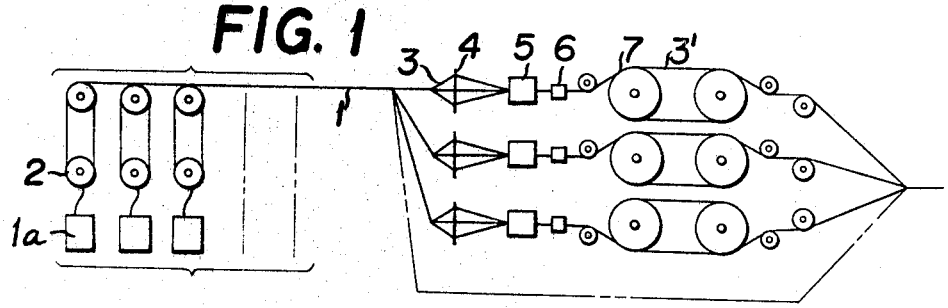
FIG. 1 is a more or less schematic diagram illustrating a system including the novel apparatus according to the invention for produicng alternately left-hand and right-hand twisted communication cables.
Figure 2:
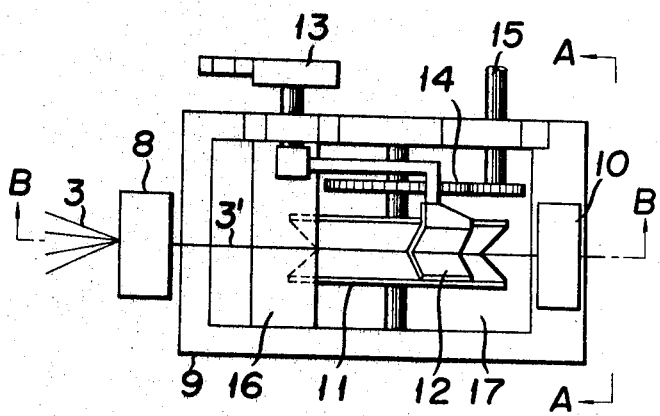
FIG. 2 is a plan view of a preferred embodiment of the apparatus according to the invention.
Figure 3:
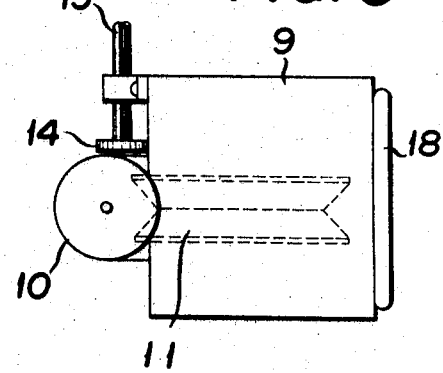
FIG. 3 is an end view of the apparatus shown in FIG. 1 as viewed from line A—A.

Referring now to FIG. 1, individual wire conductors respectively stored on individual bobbins or in individual buckets generally designated at 1a are imparted with a predetermined tension by means of tension control apparatus generally indicated by 2 to be fed into the following process line described hereinafter. The grouped conductors represented by a single solid line 3 are passed through subgrouping stations 4 where subgrouped conductors are put in proper position relative to one another, and then the respective conductor subgroups are passed through corresponding apparatus 5 for applying adhesive according to the invention where adhesive is intermittently applied to the respective subgrouped conductors, and thereafter the conductors are passed through cooling stations 6 and then accumulated on respective cradles each consisting of movable pulley pairs generally indicated at 7 which impart twist to subgrouped conductors by their rotation while at the same time accumulating a predetermined length of stranded conductors indicated at 3' without disturbing the speed of travel of conductors through the apparatus 5.

The apparatus for applying adhesive during the twisting process as described hereinabove in accordance with this invention is now described in detail with reference to FIGS. 2 to 5. It comprises an individual wire conductors gathering die (an entrance die) 8 serving as the fulcrum point for imparting twist to subgrouped conductors by the rotation of an associated rotary pulley pair 7, an adhesive tank 9 filled with adhesive, and an extra adhesive squeezing die (an exit die) 10 serving to cause intermittently or periodically applied adhesive on every twist reversal portion of the stranded conductor to migrate between adjacent conductors while squeezing off excess adhesive so as to cover the twist reversal portion with a thin adhesive layer having predetermined dimensions. Within the tank 9 there is provided a rotary wheel 11 having a radial groove of, for instance, V-shape adapted to receive therein an adhesive applying spoon 12 of a corresponding configuration which is so actuated by a cam means 13 or by a suitable electric means that it is normally received in the V-shaped groove and only when the adhesive is to be applied to the twist reversal portion of the stranded conductor indicated at 3' it is instantly shifted to a predetermined position in a close vicinity of the stranded conductor travelling between the two dies to accomplish application of a certain amount of adhesive to the portion in question of the stranded conductor 3' before returning to its normal position. The rotary wheel 11 is driven at a certain constant speed through a gear means 14 coupled to a transmission shaft 15 which is in turn driven by a motor not shown. A wiper 16 is provided in close rubbing contact with the periphery of the rotary wheel 11 in order to wipe off any extra adhesive over the periphery of the wheel. The adhesive 17 contained in the tank 9 is either fusible by heat or a highly viscous liquid solution: the most preferable is a heat fusible adhesive mainly consisting of ethylene-vinylacetate copolymer. For the sake of fusing the adhesive by heat the adhesive tank 9 may be equipped with a suitable heater 18.

Figure 4:
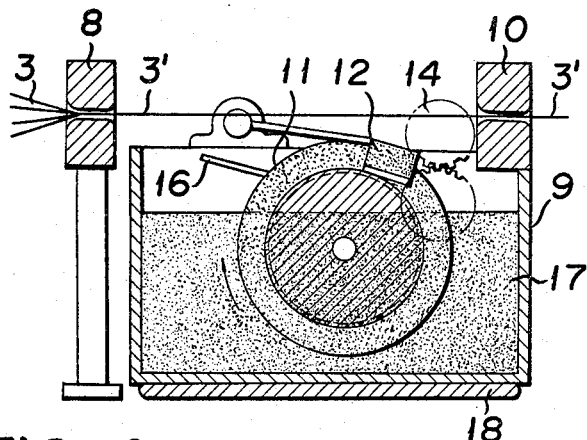
FIG. 4 is a vertical side section of the apparatus shown in FIG. 1 along line B—B.
Figure 5:
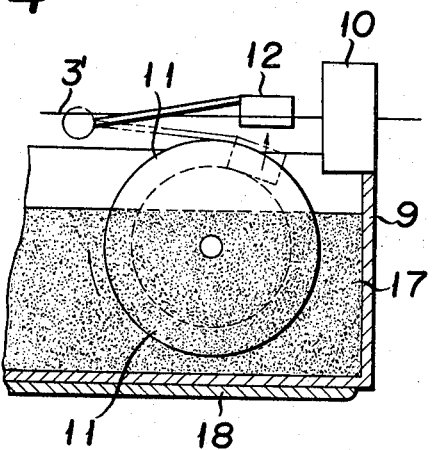
FIG. 5 is a section similar to FIG. 4 illustrating the action of the apparatus shown in FIGS. 2 to 4.

In operation when the rotary wheel 11 rotates in the sense of the arrow shown in FIG. 4, it picks up adhesive 17 contained in the tank 9 and fused by the heater 18 in its radial groove by virtue of a high viscosity of the adhesive, and the adhesive once picked up by the rotary wheel 11 more or less remains in the radial grove in which it is initially taken up owing to its high viscosity while executing a semi-circular motion together with the radial groove when the rotary wheel is rotated, so that the groove is always filled with the adhesive 17. Further, excess adhesive is wiped off by the wiper 16, so that always a constant amount of adhesive is available on the adhesive applying spoon 12. Though the adhesive applying spoon 12 is made V-shaped in this embodiment, it may be of any other suitable shape, for instance it may be a mere plate.

Now when adhesive applying spoon 12 engaging the adhesive-filled radial groove is shifted to the service position near the conductor travelling in a path slightly above the periphery of the rotary wheel 11 for a predetermined period of time under the action of the cam means 13, the adhesive carried by the spoon 12 is raised to occupy the space containing the path of travel of the stranded conductor 3', so that the stranded conductor will pass through the adhesive carried by the spoon 12 to the result that the adhesive is applied around a predetermined length of the stranded conductor advancing toward the squeezing die 10. The die hole of the squeezing die 10 is made slightly larger in diameter than the cross section of the stranded conductor, so that when the adhesive-applied portion of the stranded conductor passes through the die hole excess adhesive is squeezed off and a uniform adhesive cover having an outer sectional diameter equal to the hole diameter is formed on the adhesive applied portion of the stranded conductor. The adhesive covers formed in the above-described manner on succesively occuring twist reversal portions of the stranded conductors are then immediately cooled or dried to fix them on respective portions to obtain a stranded conductor where twist of a plurality of individual wire conductors is fixedly secured.

The action of the adhesive applying spoon 12 may be suitably controlled by appropriate electrical control means which electrically measures the length of the twisted portions and give shift orders to the spoon such that the shift of the spoon will take place just before the reversal of twist from left-hand to right-hand sense or from right-hand to left-hand sense commences. The length of the stranded conductor portion over which the adhesive is to be applied, of course, can be controlled within practical limits by suitably controlling the period during which the adhesive-carrying spoon is in the shifted position.

Figure 8:
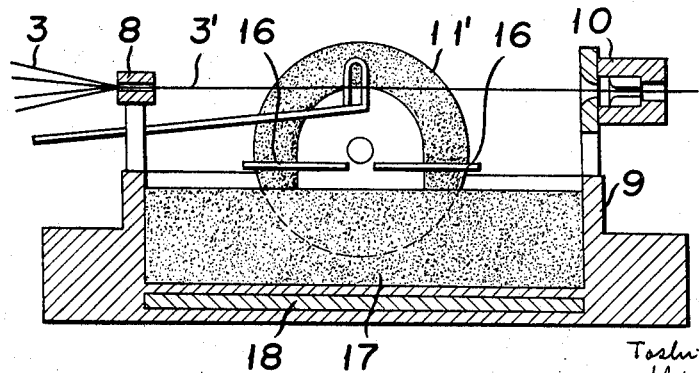
FIG. 8 is an explanatory sectional view illustrating the action of the apparatus shown in FIGS. 6 and 7.

The invention is further described in conjunction with another embodiment of the adhesive applying apparatus. FIGS. 6 to 8 inclusive illustrate another embodiment of the apparatus for applying adhesive similar to the previous embodiment, comprising a conductor gathering die 8, and adhesive tank 9, and an adhesive squeezing die 10, but different from the previous one in the mechanism of applying adhesive to the stranded conductor. In this embodiment there are two rotary wheels 11 and 11' of substantially the same dimensions and mounted on the same shaft. The gathering and the squeezing dies 8 and 10 are so disposed that the path of travel of the stranded conductor 3' lies in the substantial mid-plane between the opposite rotary wheels 11 and 11'. Each of the opposing sides of the rotary wheels 11 and 11' is contacted by one end of respective one of associating adhesive applying spoons 19 and 19' of somewhat long rod shape. The other ends of the long-rod spoons 19 and 19' remote from the rotary wheels 11 and 11' are respectively fulcrumed on a vertical pole 20 distant from the adhesive tank 9. Between the pole 20 and the tank 9 there are provided rotary members 22 and 22' respectively pivoted on the pins 21 and 21' and integral sector portions 23 and 23' of rotary members 22 and 22' are opposed to each other and kept in a mutual rotary contact relationship with each other. The rotary members 22 and 22' respectively have guide pins 24 and 24' secured at their sides nearer to the adhesive tank 9 and touching respectively the long adhesive applying spoons 19 and 19' at their substantial middle portion. Either one of the rotary members, for example, the rotary member 22' is provided with an outward extension 25 the outermost part of which is in engagement with the head of a plunger 26.

In operation, when the rotary wheels 11 and 11' rotate some quantity of adhesive contained in the tank 9 and fused by heat from the heater 18 remains stuck on the moving sides of the wheels because of a high viscosity of the adhesive. In a close proximity of the rotary wheels 11 and 11' there are respectively provided wipers 16 and 16' to wipe excessively stuck adhesive off the wheels so that always a constant amount of adhesive is available on the portions of the long adhesive applying spoons 19 and 19' which are in contact with the wheels 11 and 11' respectively.

When the outermost part of the extension 25 of the rotary member 22' is pushed by the plunger 26 in the direction of arrow, FIG. 6, for a predetermined period of time, the rotary members 22 and 22' rotate about their respective pins 21 and 21' in their respective senses indicated by arrows, thereby moving guide pins closer to each other. Consequently both of the adhesive applying spoons 19 and 19' execute pivotal motion about the pole 20 as indicated by arrows, so that their free end portions come to close proximity with the stranded conductor 3' travelling between dies 8 and 10, thereby applying adhesive to the stranded conductor 3' from both sides. By way of example the free end portion of the adhesive applying spoons 19 and 19' may be of a shape as shown in FIG. 7, or it may be of any other suitable form, such as of L-shaped section and so on. As in the previous embodiment the stranded conductor thus intermittently applied with adhesive is passed through the adhesive squeezing die 10 and the cooling means 6. The action of the adhesive applying spoons 19 and 19' as well as the length of the stranded conductor portion over which the adhesive is to be applied may also be suitably controlled as in the preceding embodiment.

Figure 9:
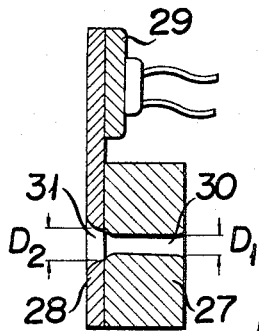
FIG. 9 is a side view, partly in section, of one embodiment of the squeezing die to be used in accordance with this invention.

The adhesive applied to the stranded conductor is effectively squeezed off by the squeezing dies according to the invention to be described hereinbelow in detail. FIG. 9 illustrates an improved squeezing die eliminating the defects of the conventional dies. It comprises a die member 27 having a central die hole with an inner diameter of $D_1$, a heating member 28 secured to the die member 27 and having a die hole concentric with the die hole of the die member 27 and with an effective inner diameter of $D_2$, and a heating means 29 fastened to the heating member 28. The die member 27 should be made from a material having polished surfaces and a sufficiently high hardness to minimize wear due to friction when the conductor passes through its die hole 30 and at the same time having a sufficiently low heat conductivity lest it should absorb heat of the conductor passing therethrough to solidify the adhesive applied to the conductor. For instance, it is preferably made of ceramic materials. The effective inner diameter $D_2$ of die hole 31 formed in the heating member 28 is greater than the inner diameter $D_1$ of the die hole 30 formed in the die member 27. The heating member 28 also is equipped at is upper portion with a heater and other heating means 29.

In operation, immediately prior to the reversal of sense of twist imparted to the stranded conductor 3' due to the reversal of rotation of rotary pulley pairs 7 shown in FIG. 1, the adhesive-applying apparatus 5 are actuated to apply fused adhesive to the twist reversal portions of the stranded conductor proceeding therethrough toward the squeezing dies. When the adhesive applied to the stranded conductor reaches the heating member 28 of the squeezing die shown in FIG. 9, then it passes through the heating member 28 while rapidly setting. However, as the heating member 28 is maintained at a temperature above melting point of the adhesive, the adhesive tending to set rapidly is fused again when it comes in contact with the heating member 28 in passing through the die hole 31 so that fused adhesive may be fed into the die hole 30 of the die member 27. The adhesive excessively applied to the stranded conductor is squeezed off at this time so that the final adhesive cover having a predetermined cross sectional diameter of $D_1$ may be formed, and the formed adhesive cover is immediately thereafter cooled or dried to be solidified and the fixed on the stranded conductor. As the heat capacity and heat conductivity of the die member 27 are made as low as possible, a temperature drop of the adhesive in the course of passing the die hole 30 of the die member is almost negligible, thus enabling the formation of the adhesive cover to be formed by squeezing off the excess adhesive which is maintained in fused state. As has been described previously, the effective inner diameter $D_2$ of the die hole 31 is made greater than the inner diameter $D_1$ of the die hole 30 so that the stranded conductor passing through the die hole 31 may not touch the heating member 28. Consequently even if the twisting operation is accidentally stopped so that a portion of the conductor is retained in the die hole 31 for a certain interval of time the excessive heating of the stranded conductor will not take place, and hence the insulation of the conductors will not be damaged.

Figure 10:
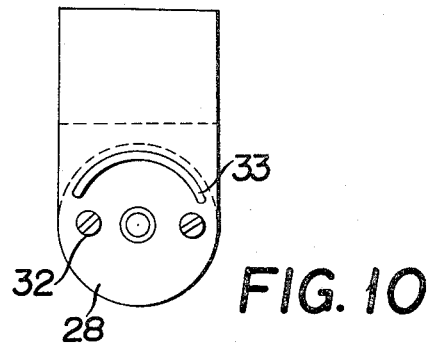
FIG. 10 is a front elevation of a modification of the squeezing die shown in FIG. 9 provided with a heat radiation.
Figure 11:
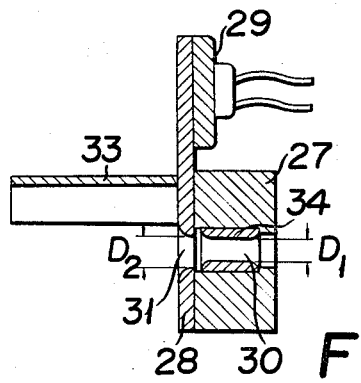
FIG. 11 is a section along line D—D of FIG. 10.

The squeezing die may be constructed, as another example, as shown in FIGS. 10 and 11. This die comprises a die member 27 secured to a heating die 28 by means of set screws 32. The heating member 28 is provided at its upper portion with a heating means 29. The heating member is also provided with a heat radiator 33 of an appropriate configuration such as a semi-cylindrically arched plate as illustrated or a flat plate and extending forwardly in spaced parallel relationship with the proceeding stranded conductor. As in the previously described die, the heating member 28 has a die hole 31 concentric with the hole 30 of the die member 27 and with an effective inner diameter $D_2$ which is sufficient to assure that the stranded conductor will not touch the inner walls of the hole 31 and which is greater than the effective inner diameter $D_1$ of die hole 30 of the die member 27. The die member 27 has its central hole 30 inserted with an inner die sleeve 34 having an inner diameter $D_1$ which assures that the standard conductor can just clear the hole 30 in a manner that there is a slight distance between said inner die sleeve and said heating member. The inner die sleeve 34 should be made of a metal sufficiently hard to prevent wear due to friction with the stranded conductor and its inner surfaces should be polished. Further, it should be made to have a wall thickness as small as possible in order to minimize its heat capacity lest it should absorb heat from the adhesive-applied stranded conductor to solidify the adhesive on the stranded conductor. For the same purpose, the squeezing die 27 should be made of a material having a small heat conductivity such as ceramic materials.

With the construction illustrated in FIGS. 10 and 11 having a heat radiator 33 extending forwardly of the heating member 28, it is possible to effectively radiate heat from the heating member 28 upon the surfaces of the stranded conductor, thus enabling sustained or continuous heating of the travelling stranded conductor until the unit enters the heating die 28. Accordingly in case the progress of the stranded conductor is interrupted at the instance of or immediately after the application of adhesive on the stranded conductor, the setting of the adhesive can be prevented so that it may be kept always in a fused state.

Figure 12:
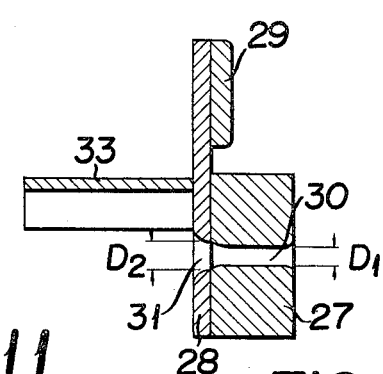
FIGS. 12 to 14 are vertical sections illustrating other embodiments of the squeezing die to be used in accordance with this invention.
Figure 13:
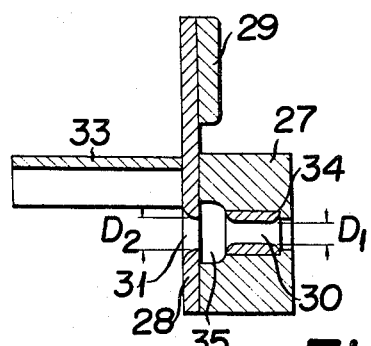
Figure 14:
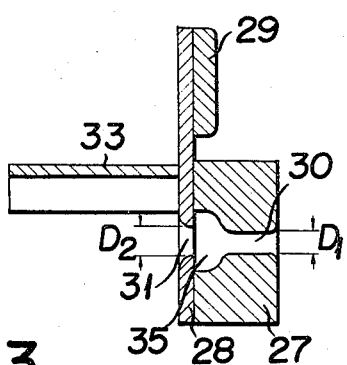

FIGS. 12 to 14 illustrate other embodiments of the squeezing die to be used in the apparatus in accordance with this invention. The squeezing die shown in FIG. 12 is similar to the die shown in FIG. 11 with the exception that the inner die sleeve 34 is absent in this die. Accordingly, in the structure of this type the die member 27 itself should be made from a material having a low heat conductivity and an excellent wear-resisting property.

The squeezing die shown in FIG. 13 is similar to the die shown in FIG. 11 but provided with a pocket portion 35 formed between the die hole 31 and the inner die sleeve 34, while the squeezing die shown in FIG. 14 is similar to the die shown in FIG. 12 but provided with a pocket portion 35 formed between the die holes 31 and 30, the pocket portion 35 in each of these squeezing dies serving to accumulate a suitable amount of adhesive therein. With such a construction the excess adhesive applied to the stranded conductor is first accumulated in the pocket portion 35 and further extra adhesive is drained down from the heating member 28. This construction of the die allows a certain length of the stranded conductor portion following the adhesive-applied portion to be applied with the adhesive accumulated in the pocket portion 35, thereby enabling compensation of a possible shortage in the length of the adhesive-applied portion as well as the control of amount of adhesive to be applied at one time by suitably adjusting the size of the pocket portion 35.

As has been described in the foregoing, according to the invention it is possible to apply adhesive to a string-like member periodically in a reliable manner by means of a simple actuating mechanism. Also according to this invention waste of adhesive excessively applied to the string-like member can be eliminated. Further the invention enables to obtain a uniform adhesive cover with a constant thickness surrounding the string-like member. Furthermore, the thickness of the adhesive cover layer can be arbitrarily adjusted. Moreover, there is no possibility of causing damage to or breaking of the string-like member during the entire course of the manufacture of the communication cables. Further an accidental stop of progress of the string-like member during the twisting operation gives rise to no trouble whatever.

It should be appreciated to those skilled in the art that many changes and modifications may be made as to the particular construction of the apparatus, and these are intended to be covered by the appended claims.

What is claimed is:

1. An apparatus for intermittently applying adhesive to string-like members comprising a gathering die serving as a fulcrum point for imparting twist to a plurality of conductors gathered together and making a stranded conductor, means intermittently actuated to come in substantial contact with said stranded conductor, means to supply a predetermined amount of adhesive to said first-mentioned means, and a squeezing die to form adhesive covers of predetermined dimensions on said stranded conductor.

2. An apparatus for intermittently applying adhesive to string-like members comprising a gathering die serving as a fulcrum point for imparting twist to a plurality of conductors gathered together and making a stranded conductor, an adhesive tank filled with adhesive, a rotary wheel partly extending within said adhesive contained in said tank and having a radial groove formed in its radial periphery, an adhesive applying spoon executing a reciprocating movement between said radial groove of said rotary wheel and the substantial path of travel of said stranded conductor some distance apart from the periphery of said rotary wheel, said adhesive applying spoon being supplied with adhesive upon coming in contact with said radial groove of said rotary wheel, and a squeezing die to form adhesive covers of predetermined dimensions on said stranded conductor.

3. An apparatus for intermittently applying adhesive to string-like members comprising a gathering die serving as a fulcrum point for imparting twist to a plurality of conductors and making a stranded conductor, an adhesive tank filled with adhesive, a pair of mutually opposedly disposed rotary wheels partly extending within said adhesive contained in said tank, a pair of adhesive applying spoons whose free end portions respectively execute a reciprocating movement between each of opposed sides of said rotary wheels and the path of travel of said stranded conductor lying in the substantial mid-plane between said rotary wheels, said adhesive applying spoons being supplied with adhesive upon coming in contact with the opposed sides of said rotary wheels, and a squeezing die to form adhesive covers of predetermined dimensions on said stranded conductor.

4. An apparatus for intermittently applying adhesive to string-like members as defined in claim 3 wherein said squeezing die includes a die member having a squeezing die hole and made from a material with a low heat conductivity, a heating member secured to said die member at the entrance side thereof and formed with a die hole concentric with said squeezing die hole and with an inner diameter greater than the inner diameter of said squeezing die hole, and a heating means fastened to said heating member.

5. An apparatus for intermittently applying adhesive to string-like members as defined in claim 4 wherein said squeezing die includes in addition a heat radiator plate provided to and forwardly extending from said heating member in spaced parallel relationship with the proceeding stranded conductor.

6. An apparatus for intermittently applying adhesive to string-like members as defined in claim 5 wherein said die member of said squeezing die has its die hole inserted with a metal inner die sleeve of substantially hollow cylindrical configuration having a small wall thickness and an inner diameter which assures that the stranded conductor can just clear said sleeve in a manner that there is a slight distance between said inner die sleeve and said heating member.

7. An apparatus for intermittently applying adhesive to string-like members as defined in claim 4 wherein a pocket portion is provided between the die hole of said heating member and the squeezing die hole of said die member, said pocket portion serving as an entrance space for said squeezing die hole.

References Cited

UNITED STATES PATENTS

| 1,992,259 | 2/1935 | Taylor | 57—35 |
| 2,089,194 | 8/1937 | Dreyfus | 57—35 |
| 2,098,333 | 11/1937 | Dreyfus et al. | 68—203 |
| 3,053,039 | 9/1962 | Demmel | 57—35 |
| 3,148,087 | 9/1964 | Aumen | 57—35 XR |
| 3,169,360 | 2/1965 | Corrall et al. | 57—164 XR |
| 3,194,000 | 7/1965 | Eldridge et al. | 57—35 XR |

FRANK J. COHEN, *Primary Examiner.*

D. E. WATKINS, *Examiner.*